Inventor:
Norman R. Dibelius,
by Paul A. Frank
His Attorney.

United States Patent Office 3,283,743
Patented Nov. 8, 1966

3,283,743
ENVIRONMENTAL CONTROL CHAMBER
Norman R. Dibelius, Ballston Spa, N.Y., assignor to General Electric Company, a corporation of New York
Filed Apr. 29, 1965, Ser. No. 451,922
6 Claims. (Cl. 119—1)

This invention relates to an environmental control chamber, and more particularly, to an apparatus for the study of the behavior of ants and other burrowing insects under controlled environmental conditions.

With the rapid advances being made in medicine and other biological sciences, the need arises to raise and keep certain creatures in controlled environments. Very often the need arises for these controlled environments to be ones that are completely sterile and thus completely free of any contaminating bacteria. Normally, even the supply of air to the creatures, being studied, will bring with it undesirable organisms which adversely affect the condition of the chamber under study. With ants and other burrowing insects, it is extremely difficult without the use of extensive equipment to maintain a sterile, germ-free atmosphere and the proper temperature and humidity conditions for proper study of the ants. Conversely, it is often desirable to add bacteria to an ant colony and study its effects thereon without having any of this bacteria escape and infect other colonies or laboratory personnel. The need then arises for an apparatus which readily permits oxygen to enter an ant colony under study and carbon dioxide to leave the colony while maintaining a controlled environment with the proper atmospheric conditions therein for study of the ants.

The chief object of my invention is the provision of apparatus for controlling the environmental conditions in an insect colony under study.

Another object of my invention is the provision of an insect enclosure which receives oxygen through a membrane covering one side thereof.

A still further object of my invention is the provision of an ant colony which is placed under water for properly controlling the environmental conditions including the temperature thereof.

These and other objects of my invention will be more readily perceived from the description which follows.

In carrying out the objects of my invention, I provide an enclosed chamber which houses a colony of ants or other burrowing insects which chamber has a semipermeable membrane covering a section thereof. The chamber is completely submerged in a body of oxygen-containing liquid, preferably water so that a controlled atmosphere is maintained therein. Oxygen from the liquid permeates the membrane for supplying the ant colony and carbon dioxide permeates the membrane in the reverse direction from the colony into the surrounding water. An environment similar to that encountered in the natural habitat of the insects or any other desirable environment is thus maintained under controlled atmospheric conditions. Since the chamber is completely submerged in water, its temperature is easily and accurately controlled by controlling the surrounding water temperature.

The drawing illustrates a preferred embodiment of my invention in which.

Figure 1:
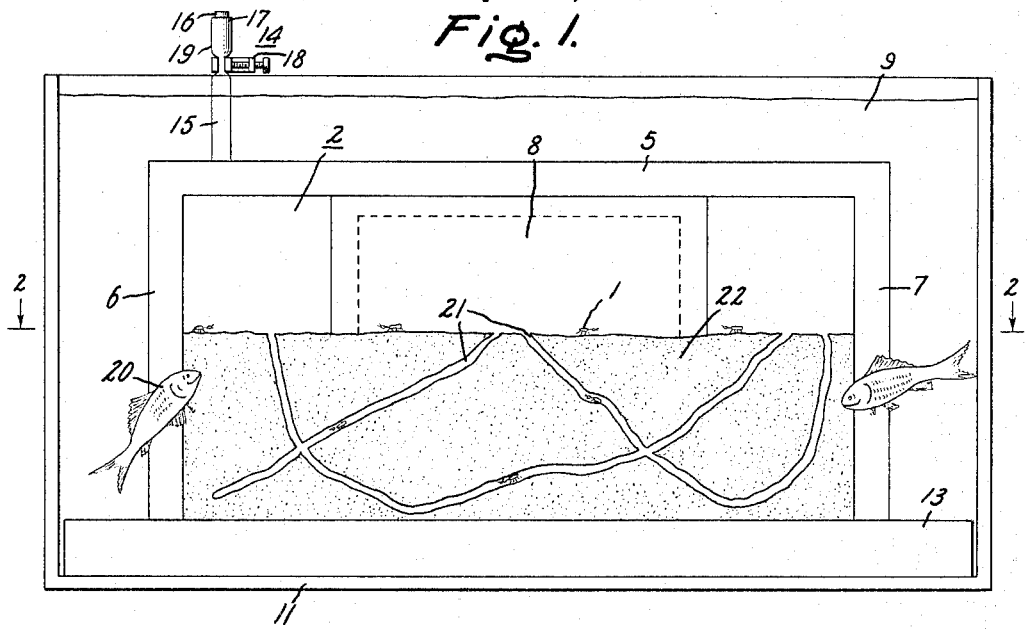
FIGURE 1 is a view of the atmospherically controlled ant chamber of my invention.
Figure 2:
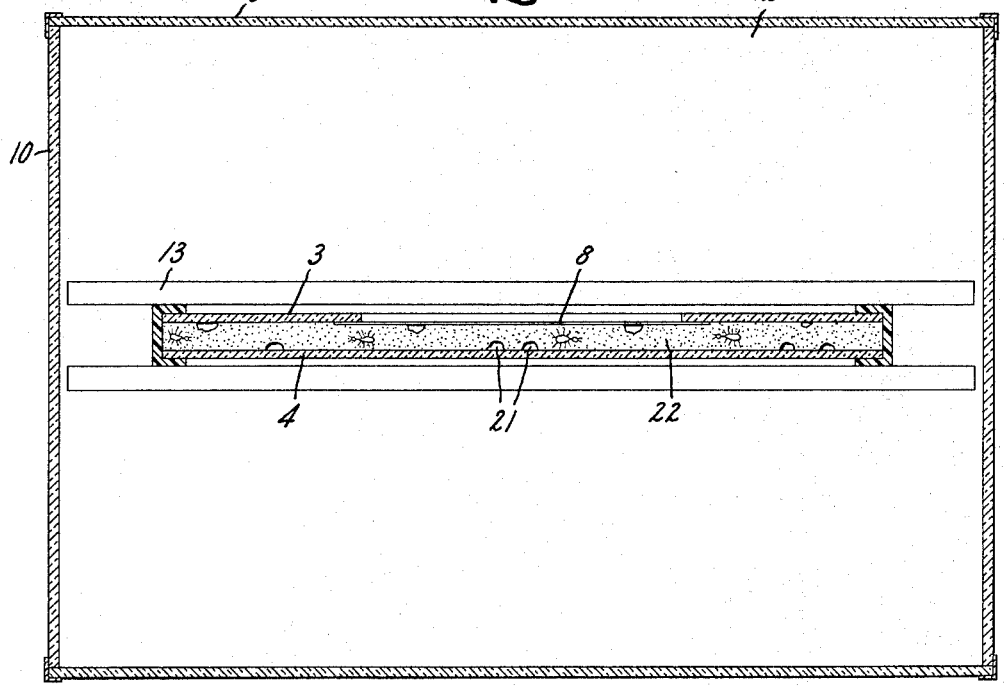
FIGURE 2 is a cross-sectional view taken along line 2—2 of FIGURE 1.

FIGURE 1 is an illustration of the apparatus for studying the behavior of ants or other burrowing insects under controlled environmental conditions. The construction includes container 2 for housing the colony of burrowing creatures for proper study thereof. Container 2 comprises a completely enclosed chamber having two side walls 3 and 4 as shown in FIGURE 2, which are constructed of a transparent material such as glass for proper observation of the creatures under study. A structural frame 5 composed of metal, plastic or other suitable material forms the top, bottom and other two sides 6 and 7 of the container and also properly supports transparent sides 3 and 4.

Wall 3 of container 2 has preferably positioned therein a permeable imperforate membrane 8 which, as will subsequently be described, provides for the necessary atmospheric conditions for proper maintenance of the insects being studied. In FIGURE 2 membrane 8 is shown as being centrally located within an opening in wall 3, but it is understood that this is merely illustrative of one embodiment of numerous that may be employed for the successful operation of the invention. It is now seen that container 3 is completely enclosed on all sides thereof, which sides are suitably fastened together, so that no liquid or gas can enter therein except by passage through membrane 8, as will be described.

Container 2 is placed within a body of water which as shown in FIGURE 1 may comprise a commercial fish tank 9, having four glass side walls 10, joined together by a suitable frame 11 and having a slate or other composition bottom 12 to properly sustain the weight of the water therein. Suitable means 13 such as thin strips of metal are placed along the bottom edge of container 2 to properly weight the container in the water so that it is properly oriented in a substantially vertical position for observation of the ants.

Membrane 8 is fabricated from an imperforate thin material such as the permselective membrane constructed of silicone rubber described in U.S. patent applications S.N. 241,346; 247,904; 269,430; and 397,687 all by Walter L. Robb and assigned to the assignee of the present invention. Membrane 8 is one that selectively permits certain gases to permeate therethrough on the basis of a difference in partial pressures. Basically, it permits a gas to permeate therethrough when the partial pressure of that gas on one side of the membrane is greater than on the other side. Thus, as the ants within container 2 use up the oxygen therein, the partial pressure of the oxygen in container 2 decreases to the point where the partial pressure of the oxygen in the surrounding water is greater than that of the oxygen in container 2. This difference in oxygen partial pressure causes oxygen from the water to permeate through membrane 8 into container 2 to supply the ants therein with the needed oxygen. In the same manner, as the ants emit carbon dioxide the partial pressure of the carbon dioxide within container 2 becomes greater than the partial pressure of carbon dioxide in the water so that the carbon dioxide within container 2 permeates through membrane 8 and into the water. Thus, the proper relationship between oxygen and carbon dioxide is maintained within container 2. It is noted that by this method of bringing oxygen into container 2 the sterility of the incoming oxygen and therefore the maintenance of properly controlled atmospheric conditions therein is easily accomplished. Thus, once container 2 is sealed and placed within fish tank 9, it is constantly under controlled conditions for proper study of the ants therein. The temperature within container 2 is also maintained very accurately since the temperature of the body of water surrounding container 2, which can be easily and accurately controlled, transmits heat to container 2. It will be appreciated that since water gains and looses heat very slowly, the temperature gradient within container 2 is kept at a negligible value. Therefore, my apparatus provides an efficient means of controlling both temperature and atmospheric conditions within container 2 while maintaining a desired atmosphere therein. The atmosphere maintained in container 2 may be a sterile germ free atmosphere if desired, or alternatively, bacteria, virus or germs may be inserted into the ant colony to study the controlled behavior therein. With the latter, it will be appreciated that the infectious organisms are completely confined and cannot escape to cross-infect other specimen or laboratory personnel. Laboratory procedures in dealing with infectious organisms are thus greatly simplified. It is further noted that the atmosphere in container 2 can be an essentially high humidity, water saturated atmosphere, very similar to that encountered within passageways in damp or moist earth where ants and other burrowing insects are most often found. The high humidity atmosphere is easily maintained because of the water saturated atmosphere (the body of water) which surrounds container 2. An apparatus is then provided whereby temperature, humidity and other atmospheric conditions for the proper study of burrowing insects, in conditions as close as possible to those existing in the natural habitat of the insects, are maintained. A stiff material such as polyethylene terephthalate may be bonded to the membrane to increase the strength thereof without adversely affecting its gas transfer properties.

Suitable means 14 is provided for placing food within container 2 without permitting the atmospheric conditions therein to be affected. Means 14 comprises a flexible tube 15 projecting through top wall 16 of container 2 and securely fastened thereto. Tube 15 has a suitable closure such as a stopper 16 completely sealing its outer end 17 to prevent the entrance of air therein. In operation, stopper 16 is removed while clamp 18 is kept securely fastened so that no air enters container 2. Food is placed within the top section 19 of tube 15 and the stopper replaced. Clamp 18 is released to permit the food to drop through tube 15 and into container 2 and then is resecured so that substantially no air has entered container 2. It will be appreciated that feeding means 14 aforementioned is merely an example of many air locking feeding arrangements that may be provided.

If desired, suitable water creatures such as fish 20 may be provided within tank 9 for study of some interrelation between them and the burrowing insects in chamber 2.

As shown in FIGURE 1, because of glass walls 4 therein, ant burrows 21 through the sand or other material 22 contained within container 2 may be readily observed.

It will be apparent from the foregoing that my invention obtains the objectives set forth. The apparatus embodying my invention is easily adapted to a multitude of situations for the maintenance of proper atmospheric and temperature conditions so that ants or other burrowing insects may be properly studied.

A specific embodiment of my invention has been described but the invention is not limited thereto since many modifications may be made by one skilled in the art and the appended claims are intended to cover all such modifications as fall within the true spirit and scope of my invention.

What I claim as new and desire to secure by Letters Patent of the United States is:

1. An artificial habitat apparatus for the study of burrowing insects comprising an oxygen containing body of liquid,
   a sealed liquid-tight container adapted to contain burrowing insects and placed within said body of liquid and
   a liquid imperforate membrane covering a section of said container comprising means for providing the passage of gases between the liquid and said container to maintain proper atmospheric conditions in said container.

2. The apparatus of claim 1 in which the liquid is water and said membrane provides oxygen from the water to permeate therethrough and into said chamber to supply insects therein with oxygen and thereby maintain controlled atmospheric conditions in said container.

3. The apparatus of claim 1 in which the liquid comprises water and said membrane provides oxygen from the water into said container and carbon dioxide within said container permeates in the reverse direction from the container into the water thereby maintaining controlled atmospheric conditions within said container, oxygen entering the container coming from the water.

4. The apparatus of claim 2 in which said membrane comprises a silicone rubber.

5. The apparatus of claim 4 in which the temperature within the container is controlled by controlling the temperature of the surrounding water and which includes air lock means for inserting food into said container so that substantially no air enters said container as food is inserted therein.

6. The apparatus of claim 1 in which the burrowing insects are ants subjected to infectious organisms, the ants being maintained in cohabitation with the infection organisms, the container being submerged within a body of water so that conditions therein are maintained substantially constant and the organisms cannot escape from the container, the membrane comprising an imperforate silicone rubber so that only oxygen enters the container from the water and a controlled atmosphere is maintained in said container.

References Cited by the Examiner
UNITED STATES PATENTS

| | | | |
|---|---|---|---|
| 2,080,160 | 5/1937 | Austin | 119—1 |
| 2,302,336 | 11/1942 | MacDonald | 119—2 |
| 2,705,489 | 4/1955 | Trexler | 128—1 |
| 2,890,680 | 6/1959 | Malkin | 119—2 |
| 2,944,513 | 7/1960 | Keely | 119—2 |
| 2,990,808 | 7/1961 | Rumonski | 119—5 X |
| 3,140,691 | 7/1964 | Stark | 119—5 |
| 3,168,887 | 2/1965 | Bodell | 119—3 |

SAMUEL KOREN, *Primary Examiner.*

ALDRICH F. MEDBERY, *Examiner.*